US009728225B2

(12) United States Patent
Hsu

(10) Patent No.: US 9,728,225 B2
(45) Date of Patent: Aug. 8, 2017

(54) SYSTEMS AND METHODS FOR VIEWING INSTANT UPDATES OF AN AUDIO WAVEFORM WITH AN APPLIED EFFECT

(71) Applicant: Cyberlink Corp., Shindian, Taipei (TW)

(72) Inventor: Chun-Yen Hsu, Taichung (TW)

(73) Assignee: CYBERLINK CORP., Shindian, Taipei (TW)

( * ) Notice: Subject to any disclaimer, the term of this patent is extended or adjusted under 35 U.S.C. 154(b) by 749 days.

(21) Appl. No.: 14/079,684

(22) Filed: Nov. 14, 2013

(65) Prior Publication Data

US 2014/0281986 A1  Sep. 18, 2014

Related U.S. Application Data

(60) Provisional application No. 61/777,507, filed on Mar. 12, 2013.

(51) Int. Cl.
| | |
|---|---|
| *G06F 17/00* | (2006.01) |
| *G11B 27/031* | (2006.01) |
| *G06F 3/0484* | (2013.01) |
| *G10H 1/00* | (2006.01) |
| *G10H 1/06* | (2006.01) |
| *G11B 27/34* | (2006.01) |

(52) U.S. Cl.
CPC ........ *G11B 27/031* (2013.01); *G06F 3/04847* (2013.01); *G10H 1/0091* (2013.01); *G10H 1/06* (2013.01); *G11B 27/34* (2013.01)

(58) Field of Classification Search
CPC G06F 3/04847; G10H 1/0091; G10H 1/0575; G10H 1/06; G10H 2250/571
See application file for complete search history.

(56) References Cited

U.S. PATENT DOCUMENTS

| | | |
|---|---|---|
| 5,675,778 A | 10/1997 | Jones |
| 6,392,135 B1 | 5/2002 | Kitayama |

(Continued)

FOREIGN PATENT DOCUMENTS

JP    2001147691    5/2001

OTHER PUBLICATIONS

Adobe Audition Help and Tutorials, Jun. 2013.

*Primary Examiner* — Thomas Maung
(74) *Attorney, Agent, or Firm* — McClure, Qualey & Rodack, LLP

(57) ABSTRACT

A method implemented in an audio editing device comprises retrieving, by the editing device, audio content and obtaining from a user via the user interface an effect to be applied to the audio content. The method further comprises determining a target number of samples based on the obtained effect, obtaining the target number of samples of the audio content, and identifying, within the obtained target number of samples, a maximum amplitude and a minimum amplitude. The method further comprises applying the effect to the obtained target number of samples and displaying on the user interface, a graphical representation of the obtained target number of samples with the applied effect, wherein the graphical representation depicts amplitude varying as a function of time, wherein displaying the graphical representation is performed prior to generating an audio output file with the effect applied to the audio content.

19 Claims, 8 Drawing Sheets

(56) References Cited

U.S. PATENT DOCUMENTS

| | | |
|---|---|---|
| 8,225,207 B1 | 7/2012 | Ramirez |
| 2008/0190271 A1* | 8/2008 | Taub .................... G10H 1/0058 84/645 |
| 2009/0183078 A1 | 7/2009 | Clement et al. |
| 2012/0297958 A1* | 11/2012 | Rassool ................ G06F 3/0481 84/609 |
| 2013/0061144 A1* | 3/2013 | Eppolito ............. G06F 3/04847 715/716 |

* cited by examiner

SYSTEMS AND METHODS FOR VIEWING INSTANT UPDATES OF AN AUDIO WAVEFORM WITH AN APPLIED EFFECT

CROSS-REFERENCE TO RELATED APPLICATION

This application claims priority to, and the benefit of, U.S. Provisional Patent Application entitled, "Viewing Instant Updates of a Waveform in an Audio Clip with an Applied Effect," having Ser. No. 61/777,507, filed on Mar. 12, 2013, which is incorporated by reference in its entirety.

BACKGROUND

The availability of multimedia content in a vast array of digital formats has facilitated distribution of multimedia content because of the high degree of portability. Off-the-shelf multimedia editing applications provide users with the capability to incorporate special effects into captured images, audio and video. Many audio editing applications offer a library of special effects for allowing users to enrich audio content. Users may then apply a desired special effect, preview the edited content, and then produce an edited audio file with special effect incorporated.

SUMMARY

Briefly described, one embodiment, among others, is a method implemented in an audio editing device comprises retrieving, by the editing device, audio content and obtaining from a user via the user interface an effect to be applied to an audio segment of the audio content. The method further comprises determining a target number of samples of the audio content based on the obtained effect, wherein the target number of samples varies with an effect type, and identifying a maximum amplitude and a minimum amplitude within the audio segment. The method further comprises obtaining samples of the audio segment from a first temporal window located in a vicinity of the maximum amplitude and a second temporal window located in a vicinity of the minimum amplitude such that total number of obtained samples is equal to or greater than the target number of samples. The method further comprises applying the effect to the obtained target number of samples and displaying on the user interface, a graphical representation of the obtained target number of samples with the applied effect for the user to preview, wherein the graphical representation depicts amplitude varying as a function of time, wherein displaying the graphical representation is performed prior to generating an audio output file with the effect applied to the audio content.

Another embodiment is a system for previewing an audio effect, comprising a processor and a media interface executed in the processor configured to retrieve audio content. The system further comprises a user interface generator configured to generate a user interface and obtain from a user an effect to be applied to the audio content, a content analyzer configured to determine a target number of samples based on the obtained effect, wherein the target number of samples varies with an effect type, and a sampling component configured to obtain the target number of samples of the audio content. The content analyzer identifies, within the obtained target number of samples, a maximum amplitude and a minimum amplitude, wherein the user interface generator applies the effect to the obtained target number of samples and displays a graphical representation of the obtained target number of samples with the applied effect on the user interface, wherein the sampling component obtains the target number of samples of the audio content from a first temporal window in a vicinity of the maximum amplitude and a second temporal window in a vicinity of the minimum amplitude, wherein the graphical representation depicts amplitude varying as a function of time, wherein displaying the graphical representation is performed prior to generating an audio output file with the effect applied to the audio content.

Another embodiment is a non-transitory computer-readable medium embodying a program executable in a computing device, comprising code that generates a user interface and obtain from a user an effect to be applied to an audio segment of audio content, code that identifies, within the audio segment, a maximum amplitude and a minimum amplitude, and code that obtains a target number of samples of the audio content from a first temporal window in a vicinity of the maximum amplitude and a second temporal window in a vicinity of the minimum amplitude based on the obtained effect, wherein the target number of samples varies with effect type. The program further comprises code that applies the effect to the obtained target number of samples and displays a graphical representation of the obtained target number of samples with the applied effect on the user interface, wherein the graphical representation depicts amplitude varying as a function of time, wherein displaying the graphical representation is performed prior to generating an audio output file with the effect applied to the audio content.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for providing users with a user interface for viewing changes in real time when the user applies an audio effect to audio content or when the user adjusts a parameter of a previously-applied effect, thereby allowing the user to determine immediately whether the desired effect was successfully applied. The user may also preview the effect before generation of an output audio file, which can be computationally intensive.

One embodiment, among others, is a method for editing audio in an editing device and for previewing audio effect. The method comprises retrieving audio content and obtaining from a user via the user interface an effect to be applied to the audio content. The effect may comprise, for example and without limitation, a reverb effect, a delay effect, or other audio effect to be applied to the audio content. The method further comprises determining a target number of samples based on the obtained effect and the time duration in which the effect is to be applied. In this regard, the effect specified by the user determines the target number of samples to obtain.

The method further comprises obtaining the target number of samples of the audio content and identifying, within the audio segment to be applied with effect, a maximum or relatively high amplitude and a minimum or relatively low amplitude. That is, it should be emphasized that the embodiments disclose herein are not limited to processing the absolute maximum and absolute minimum within a window. Instead, relatively high amplitudes and relatively low amplitudes may be used for sampling purposes.

The effect is applied to the obtained target number of samples and a graphical representation of the obtained target number of samples with the applied effect is displayed on the user interface. Notably, the graphical representation is presented to the user for fast preview purposes and thus, the graphical representation represents a simulated waveform of the edited audio content that the user is able to preview before actually generating an edited audio output file. A description of a system for facilitating an audio editing process is now described followed by a discussion of the operation of the components within the system.

Figure 1:
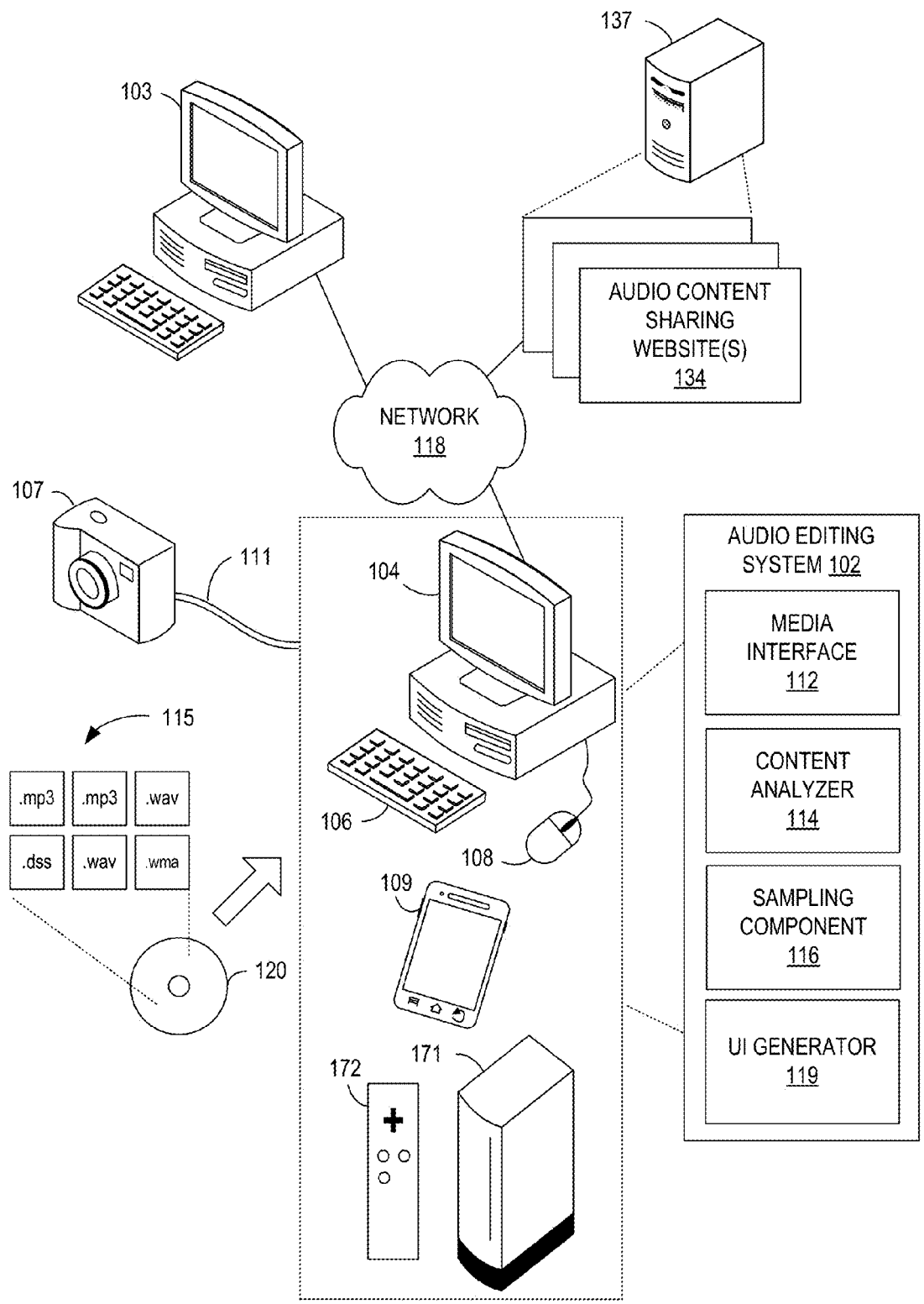
FIG. 1 is a block diagram of a system in which embodiments of an audio editing device may be implemented in accordance with various embodiments of the present disclosure.

FIG. 1 is a block diagram of an audio editing system 102 in which embodiments of the video processing techniques disclosed herein may be implemented. The audio editing system 102 may be embodied, for example, as a desktop computer, computer workstation, laptop, a smartphone 109, a tablet, or other computing platform and includes a display 104 and may include such input devices as a keyboard 106 and a mouse 108.

For embodiments where the audio editing system 102 is embodied as a smartphone 109 or tablet, the user may interface with the audio editing system 102 via a touch-screen interface (not shown). In other embodiments, the audio editing system 102 may be embodied as a video gaming console 171, which includes a video game controller 172 for receiving user preferences. For such embodiments, the video gaming console 171 may be connected to a television (not shown) or other display.

The audio editing system 102 is configured to retrieve, via the media interface 112, digital media content 115 stored on a storage medium 120 such as, by way of example and without limitation, a compact disc (CD, DVD, Blue-ray Disc) or a universal serial bus (USB) flash drive, wherein the digital media content 115 may then be stored locally on a hard drive of the audio editing system 102. As one of ordinary skill will appreciate, the digital media content 115 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Median audio (WMA), or any number of other digital formats.

As depicted in FIG. 1, the media interface 112 in the audio editing system 102 may also be configured to retrieve digital media content 115 from any medium to the audio editing system 102. The audio editing system 102 may support any one of a number of common computer interfaces, such as, but not limited to IEEE-1394 High Performance Serial Bus (Firewire), USB, a serial connection, and a parallel connection.

A digital recording device 107 may also be coupled to the audio editing system 102 over a wireless connection or other communication path. The audio editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the audio editing system 102 may receive digital media content 115 from another computing system 103. Alternatively, the audio editing system 102 may access one or more audio content sharing websites 134 hosted on a server 137 via the network 118 to retrieve digital media content 115.

The content analyzer 114 in the audio editing system 102 is configured to analyze and identify attributes of the special effect to be applied to the media content 115 in order to facilitate sampling and generation of a waveform on a user interface for presentation to a user. For example, the content analyzer 114 may analyze a special effect specified by the user and determine a target number of samples for the sampling component 116 to obtain. The target number of samples varies with the type of audio effect the user has selected. More details are discussed below in connection with FIG. 6.

The sampling component 116 is further configured to obtain subsamples of the audio content based on the determined target number of samples within a first temporal window centered about a maximum peak within the target number of samples. Note that the maximum peak can be a relatively high amplitude within the audio segment and is not limited to an absolute maximum value. The sampling component 116 also obtains additional subsamples of the audio content based on the determined target number of samples within a second temporal window centered about a minimum peak within the target number of samples. The minimum peak can be a relatively low amplitude within the audio segment and is not limited to an absolute minimum value. The sampling component 116 then generates an audio sample peak file upon obtaining the total amount of target samples within the first and second temporal windows.

The user interface (UI) generator 119 is executed to generate a user interface that displays a waveform of the edited audio content for the user to preview based on the sample peak file. It should be emphasized that the preview waveform represents an estimated output waveform and may slightly differ from the actual waveform after the audio file is output. The user interface allows the user to select or specify an effect to be applied to the media content 115. The user further specifies a time period in which to apply the effect using the user interface. The user interface also includes a graphical timeline component with the applied effect(s) arranged according to time.

Figure 2:
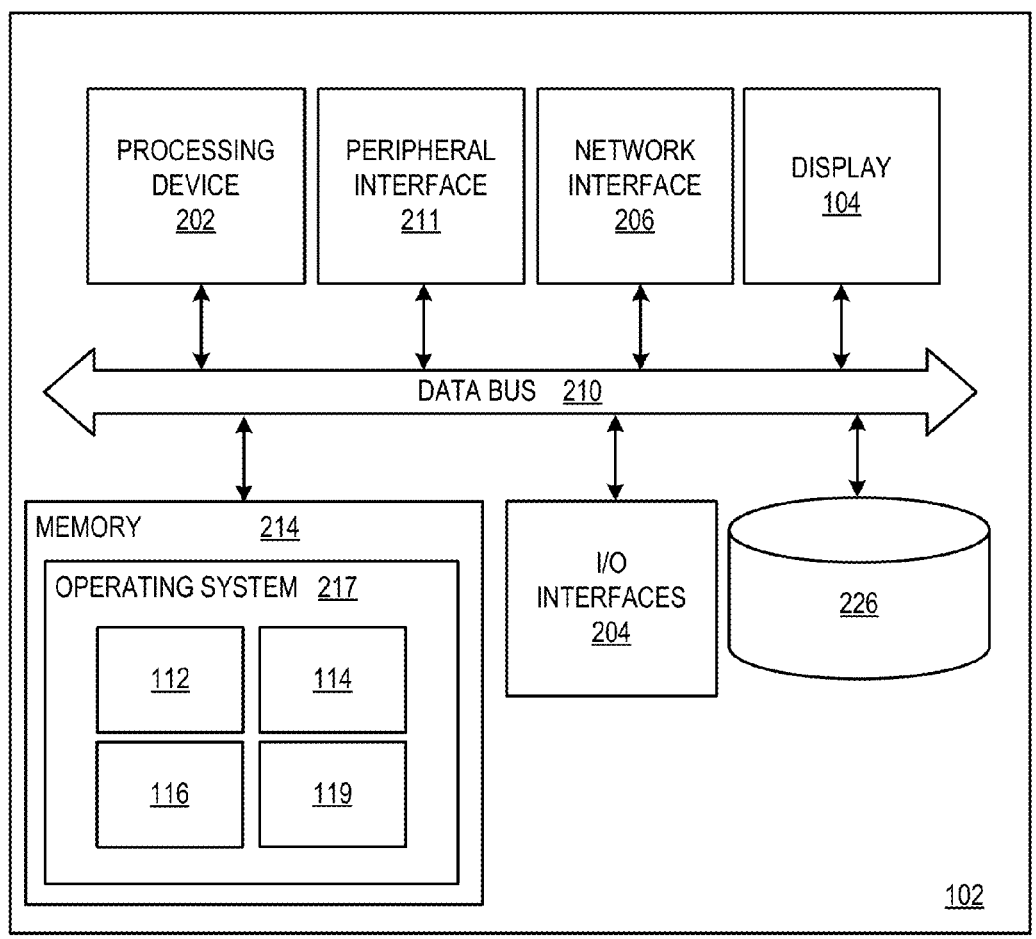
FIG. 2 is a detailed view of the audio editing device of FIG. 1 in accordance with various embodiments of the present disclosure.

FIG. 2 is a schematic diagram of the audio editing system 102 shown in FIG. 1. The audio editing system 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the audio editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the audio editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, content analyzer 114, sampling component 116, UI generator 119) of the audio editing system 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the audio editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The audio editing system 102 may communicate with one or more computing devices via the network interface 206 over the network 118 (FIG. 1). The audio editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
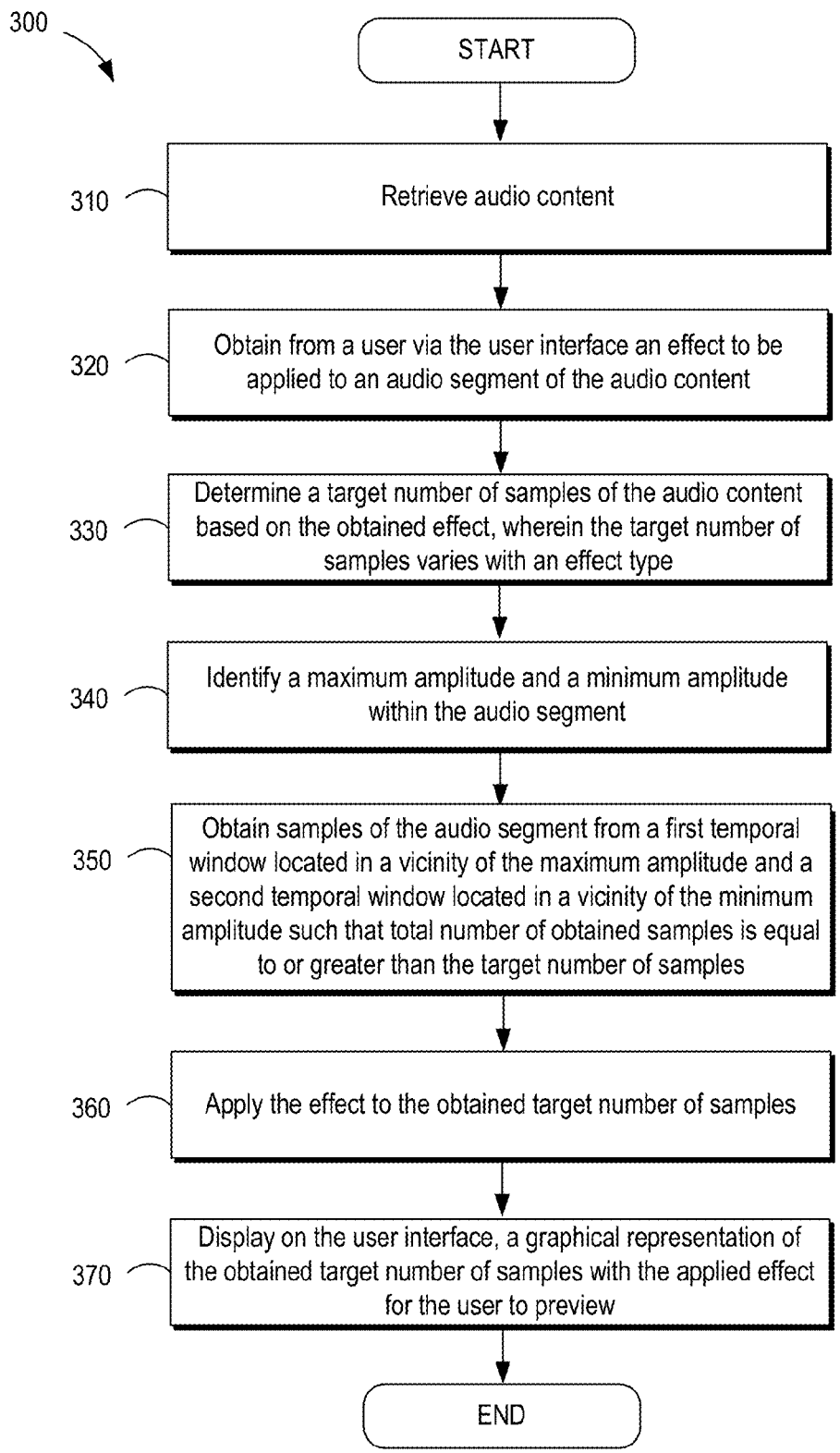
FIG. 3 is a top-level flowchart illustrating examples of functionality implemented as portions of the audio editing device of FIG. 1 for facilitating audio editing according to various embodiments of the present disclosure.

Reference is made to FIG. 3, which is a flowchart 300 in accordance with one embodiment for facilitating audio editing. It is understood that the flowchart 300 of FIG. 3 provides merely an example of the many different types of functional arrangements that may be employed to implement the operation of the various components of the audio editing system 102 (FIG. 1). As an alternative, the flowchart of FIG. 3 may be viewed as depicting an example of steps of a method implemented in the audio editing system 102 according to one or more embodiments.

Beginning with block 310, the media interface 112 (FIG. 1) retrieves audio content and in block 320, the user interface generator 119 (FIG. 1) generates a user interface and obtains an effect from the user to be applied to the audio content. In block 330, the content analyzer 114 (FIG. 1) determines a target number of samples based on the effect obtained from the user. In accordance with various embodiments, the effect that the user selects and the time duration in which the effect is to be applied determine the target number of samples to obtain for the audio content.

In block 340, the content analyzer 114 identifies a maximum amplitude and a minimum amplitude within the audio segment. In block 350, the sampling component 116 (FIG. 1) obtains samples of the audio segment from a first temporal window located in a vicinity of the maximum amplitude and a second temporal window located in a vicinity of the minimum amplitude such that total number of obtained samples is equal to or greater than the target number of samples. In block 360, the user interface generator 119 applies the effect to the obtained target number of samples in the audio segment.

In block 370, the user interface generator 119 displays a preview waveform representation (i.e., a graphical representation) of the obtained samples on the user interface. It should be emphasized that the graphical representation is displayed prior to actually generating an audio output file with the effect applied to the audio content, thereby allowing the user to preview the changes prior to generating the audio output file. Notably, the graphical representation is a simulated waveform of the edited audio content and facilitates the editing process by providing the user with a fast and efficient means for previewing the waveform.

Figure 4:
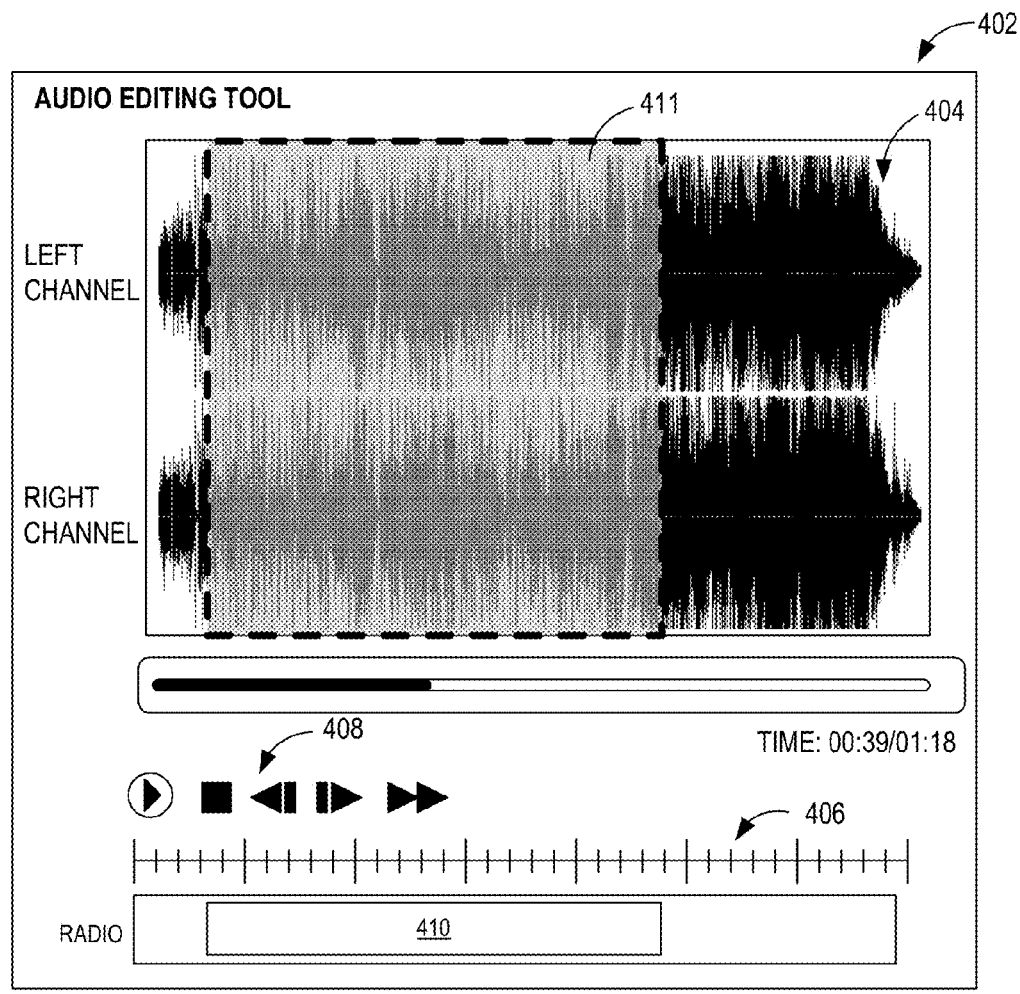
FIG. 4 is an example user interface for editing audio content in accordance with various embodiments.

Reference is made to FIG. 4, which is an example user interface 402 generated by the user interface generator 119

(FIG. 1) for editing audio content in accordance with various embodiments. The example interface 402 shown allows the user to apply effects to audio content. The user interface 402 in FIG. 4 includes playback controls 408 and a timeline component 406 that corresponds to a waveform representation 404 of the audio content to be edited. In the example shown, the user has selected a "radio" sound effect to be applied to the audio content.

The width of the effects bar 410 corresponds to the time duration in which the effect is to be applied to the audio content. A corresponding audio segment 411 equal in duration is also shown, where the audio segment 411 allows the user to preview the effect applied to the audio content. The user may select the desired effect from an effects toolbar component (not shown) or other selection means. The user may adjust the duration of the effect by resizing the effects bar 410 with a mouse, touchscreen interface, or other resizing means. Note that if the user adjusts the duration of the effect, the preview waveform presentation will be updated instantly according to the updated effect and time duration. As described, the waveform presentation techniques disclosed facilitate the editing process by allowing the user to preview effects in real time prior to actually generating an audio output file.

Figure 5:
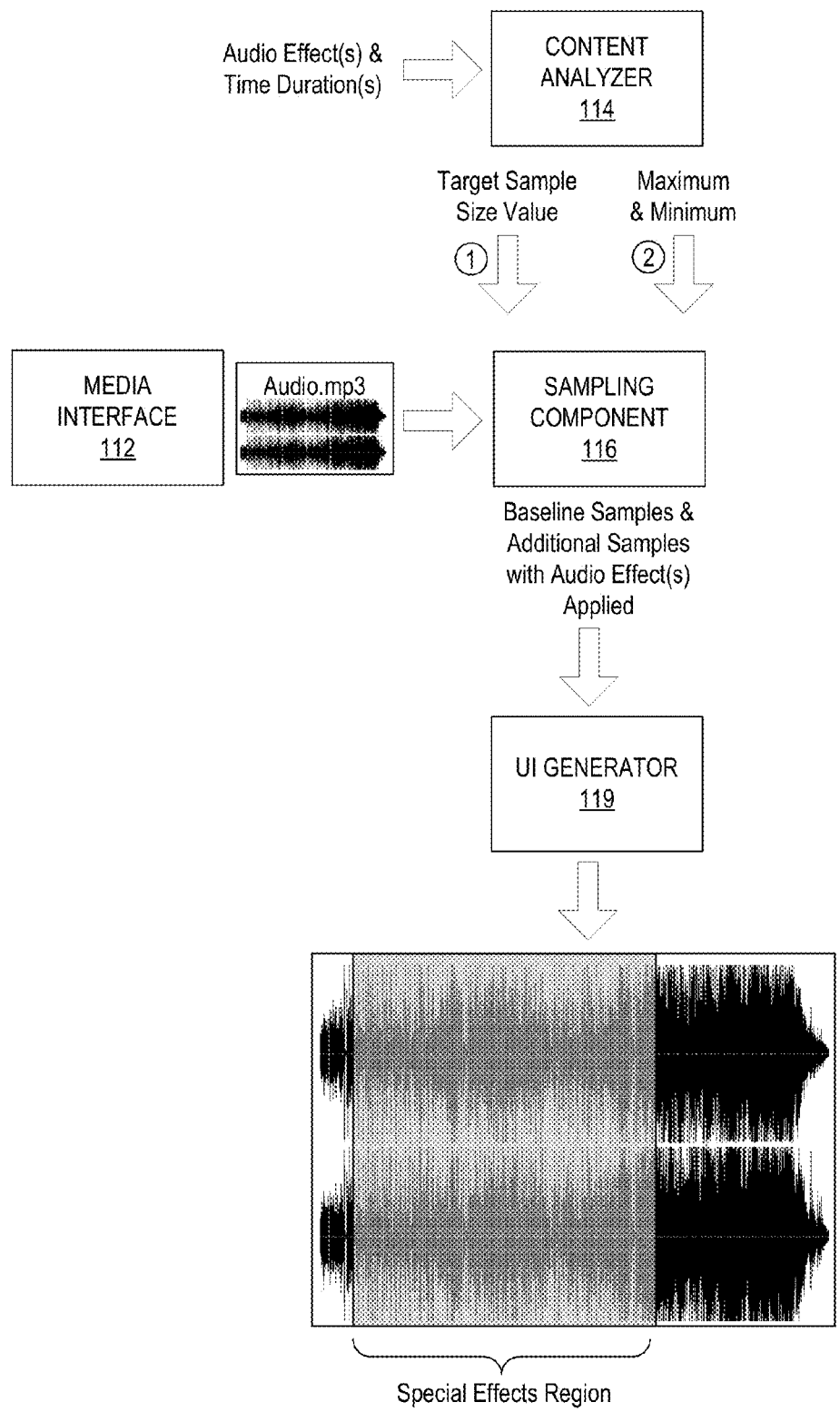
FIG. 5 illustrates the process flow between the various components in the audio editing system of FIG. 1 in accordance with various embodiments.

Reference is made to FIG. 5, which illustrates the process flow between the various components in the audio editing system 102 of FIG. 1. An input file (e.g., audio.mp3) with audio content is obtained by the media interface 112 and forwarded to the sampling component 116. The user generator 119 generates a user interface and obtains one or more audio effects from the user to be applied to the audio content.

The content analyzer 114 determines a target sample size value based on the selected effect(s) and the time duration(s) for applying the effect(s), where the effect(s) was selected from a predetermined grouping of effects presented to the user. For example, the user may be presented with a user interface with an effects toolbar or other selection means with various effects including, by way of example and without limitation, dynamic range control, a radio sound effect, a phone sound effect, reverb effect, a delayed effect, an equalizer effect, and so on.

The user may select one or more of the effects in the grouping and may specify a different time duration for each effect. For some embodiments, the user may also specify a custom-effect. For example, the user may wish to insert other audio content into the audio content or manually adjust the gain over a certain time duration within the audio content. The target sample size value is sent to the sampling component 116, which then obtains samples from the audio content based on the specified target sample size. The content analyzer 114 analyzes the samples captured by the sampling component 116 and identifies a maximum peak value and a minimum peak value and passes this information back to the sampling component 116, which then obtains additional samples of the audio content within a first temporal window centered about the maximum amplitude.

The sampling component 116 also obtains additional samples of the audio content within a second temporal window centered about the minimum amplitude. Note that the sum of the number of samples obtained from the first temporal window and the number of samples obtained from the second temporal window is generally greater than or equal to the target number of samples, which correspond to the baseline samples. The sampling component 116 applies the selected effect(s) to the target number of samples obtained within the temporal windows around the maximum and minimum peaks and generates a sample peak file. The user interface generator 119 generates a waveform representation in the user interface based on the peak file, thereby allowing the user to preview the one or more effects applied to the audio content.

Figure 6:
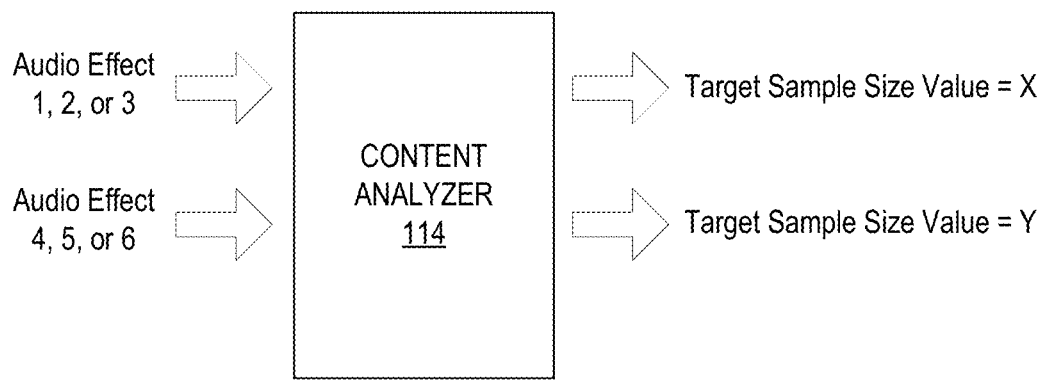
FIG. 6 illustrates determination of the target sample size by the content analyzer in the audio editing system of FIG. 1 in accordance with various embodiments.

FIG. 6 illustrates determination of the target sample size by the content analyzer 114 in the audio editing system of FIG. 1. As discussed above, the target sample size value sent to the sampling component 116 for obtaining samples of the audio content is determined based on the audio effect(s) selected by the user. For some embodiments, the user is able to select from a predetermined grouping of effects. In the example shown in FIG. 6, the user is able to select from six effects. As shown, a subset of the effects (for example, effect 1, 2, or 3) corresponds to a first target sample size value (X) while another subset of the effects (for example, effect 4, 5, or 6) corresponds to a second target sample size value (Y) due to the fact that some effects require a larger number of audio samples for purposes of generating a waveform representation on the user interface. For some embodiments, the target sample size varies as a function of the effect because in some instances, some of the effect to be applied may first be converted from the time domain to the frequency domain during processing. The system therefore determines a compatible target sample size for purposes of performing Fast Fourier Transform (FFT) processing.

Figure 7:
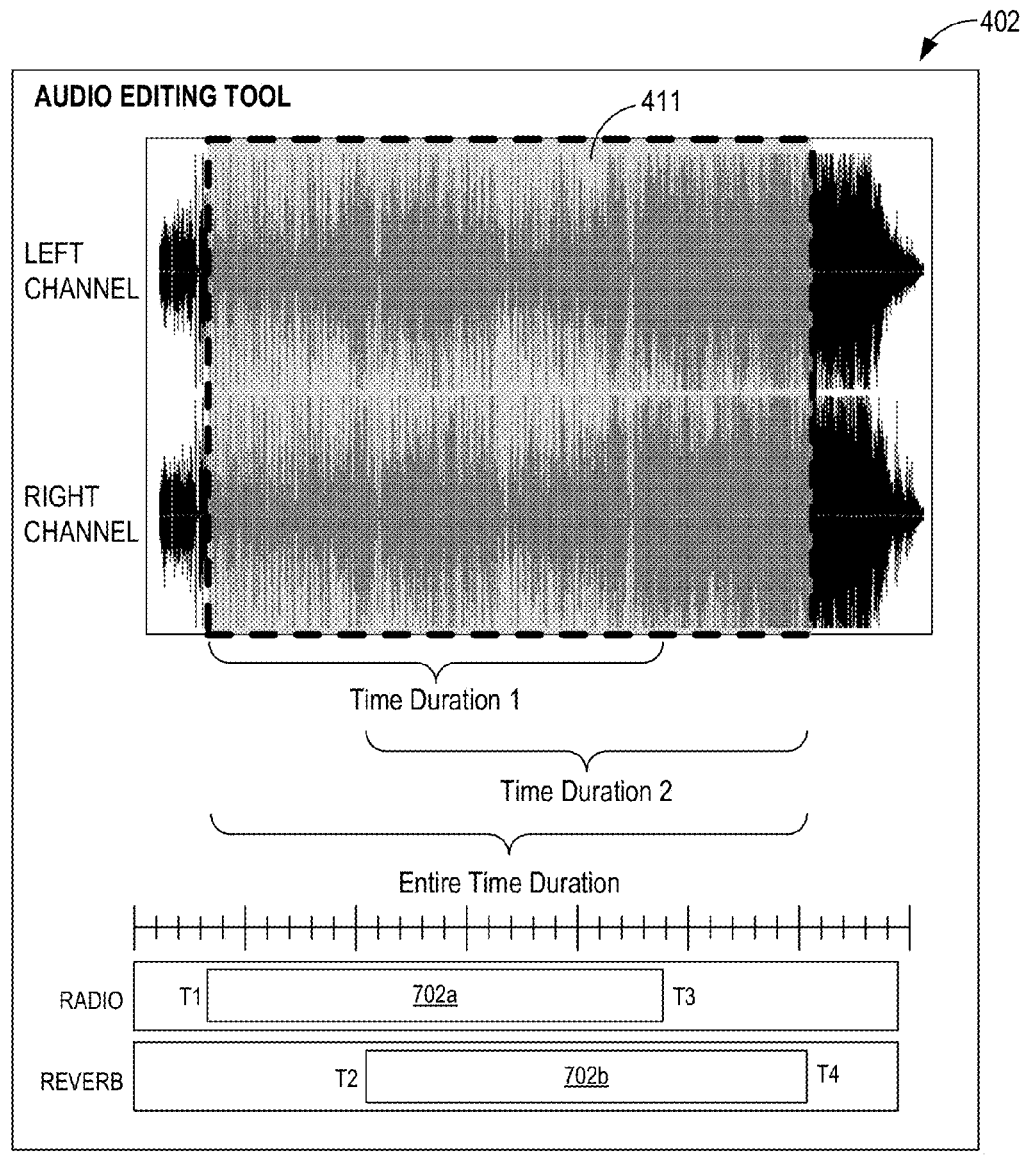
FIG. 7 illustrates a variation of the user interface in FIG. 5 in accordance with various embodiments.

Reference is made to FIG. 7, which is a variation of the user interface 402 shown in FIG. 5. As discussed above, for some embodiments, the user may select more than one audio effect to be applied to the audio content. In the example shown, the user selects multiple effects and specifies different time durations in which the effects are to be applied. Effects bar 702a corresponds to the time duration for the first effect, and effects bar 702b corresponds to the time duration for the second effect.

The entire time duration spanning the first time duration and the second time duration is sent to the content analyzer 114 (FIG. 1) in addition to the specified effects. Based on this information, the content analyzer 114 determines the target sample size value. Upon receiving samples from the sampling component 116, the content analyzer 114 identifies a maximum peak and a minimum peak within the samples and forwards this information back to the sampling component 116 for obtaining the target number of samples around the maximum and minimum peaks, as described in connection with FIG. 5.

Note that as the target number of samples of the first duration is already obtained (spanning time T1 to time T3), if a second effect is applied, there is an overlap region that spans T2 to T3. In this case, the samples obtained in the window spanning T2 to T3 comprise a portion of the samples obtained across the first duration (T1 to T3). Additional samples are only required for the window spanning T3 to T4. Note also that the total number of samples of the second duration is the second target number. Thus, the system only needs to obtain more samples from T3 to T4 to reach the second target number of samples.

Figure 8:
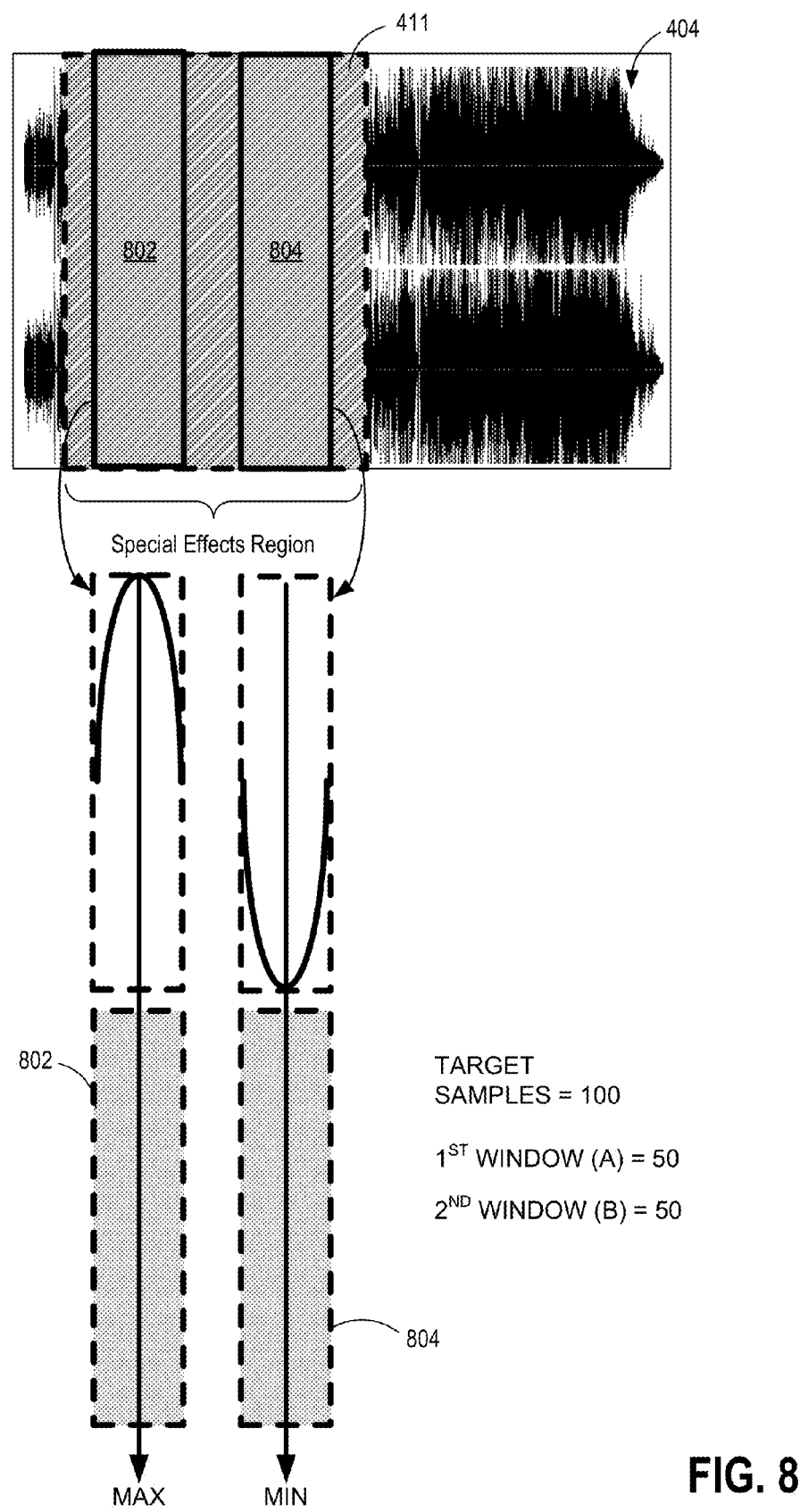
FIG. 8 illustrates obtaining samples within first and second temporal windows in accordance with various embodiments.

To further illustrate the concept relating to obtaining a target number of samples and obtaining samples within first and second temporal windows, reference is made to FIG. 8. Again, a waveform representation 404 is shown in addition to an audio segment 411, where the width of the audio segment 411 corresponds to the duration in which the effect is to be applied to the audio segment 411. Assume, for purposes of illustration, that a maximum value and a minimum value are identified within the audio segment 411. In accordance with various embodiments, a first temporal window 802 is defined around the maximum value, and a second temporal window 804 is defined around the minimum value, where the first temporal window 802 and the second temporal window 804 may be the same size. Furthermore, for some embodiments, the first and second temporal windows 802, 804 may be centered about the maximum value and the minimum value, respectively.

Assume for purposes of this example that based on the audio effect to be applied, the target number of samples is determined to be 100. For some embodiments, the system obtains a number of samples within the first temporal window 802 and the second temporal window 804 such that the total number of samples obtained in both windows is equal to the target number samples (100). Typically, this will involve obtaining half the samples for each of the windows (50+50). Note, however, that within the first temporal window 802, the number of samples to the left of the max will not necessarily be equal to the number of samples to the right of the max. In this regard, the number of samples within the first and second temporal windows is divided approximately in half (e.g., 24+26 samples).

To further illustrate, suppose that the entire audio waveform representation 404 comprises 100,000 samples, where the audio segment contains 400 samples spanning sample #101 to sample #500. Suppose that based on the effect to be applied to the audio segment 411, the target number of samples to be obtained is determined to be 100. Suppose also that the maximum value corresponds to sample #200 and that the minimum value corresponds to sample #350. In this case, a total of 50 samples will be obtained from the first temporal window 802. Specifically, the samples will span from sample #175 to sample #224. Similarly, a total of 50 samples will be obtained from the second temporal window 804. Specifically, the samples will span from sample #333 to sample #382. In this regard, the target number of samples is equal to the number samples obtained in the first temporal window 802 and the number samples obtained in the second temporal window 804. It should be emphasized that the number of samples obtained in the first temporal window 802 is not necessarily equal to the number of samples obtained in the second temporal window 804. Furthermore, if there are multiple effects (for example, as shown in the example of FIG. 7), then the largest target number is used.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in an editing device for previewing an audio effect, comprising:
retrieving, by the editing device, audio content;
obtaining from a user via a user interface an effect to be applied to an audio segment of the audio content;
determining a target number of samples of the audio segment based on the obtained effect, wherein the target number of samples varies with an effect type of the obtained effect;
identifying a maximum amplitude and a minimum amplitude within the audio segment;
determining a first temporal window of a predetermined size centered about the maximum amplitude and a second temporal window of the predetermined size centered about the minimum amplitude;
obtaining a target number of samples from the first temporal window and the second temporal window within the audio segment;
obtaining the audio segment and a corresponding time period in which to apply the effect from the user via the user interface, wherein the target number of samples of the audio segment is obtained within the time period;
applying the effect to the target number of samples obtained within each of the first temporal window and the second temporal window; and
displaying on the user interface, a graphical representation of the first temporal window and the second temporal window having the obtained target number of samples with the applied effect for the user to preview, wherein the graphical representation depicts amplitude varying as a function of time, wherein displaying the graphical representation is performed prior to generating an audio output file with the effect applied to the audio content.

2. The method of claim 1, further comprising:
obtaining additional samples of the audio content within the first temporal window centered about the maximum amplitude; and
obtaining additional samples of the audio content within the second temporal window centered about the minimum amplitude.

3. The method of claim 2, wherein a number of additional samples to be obtained within the first temporal window and a number of additional samples to be obtained within the second temporal window are based on the determined target number of samples.

4. The method of claim 2, further comprising generating a sample peak file upon obtaining the additional samples within the first and second temporal windows, wherein displaying the graphical representation is based on the sample peak file.

5. The method of claim 1, further comprising displaying a bar on the user interface corresponding to the time period in which to apply the effect.

6. The method of claim 1, further comprising:
obtaining a second effect from the user via the user interface; and
obtaining a second time period in which to apply the second effect from the user via the user interface, wherein a second target number of samples of the audio segment is determined and obtained within the second time period.

7. The method of claim 6, displaying a second bar on the user interface corresponding to the second time period in which to apply the second effect.

8. The method of claim 1, wherein the effect obtained from the user via the user interface is one of a predetermined grouping of effects.

9. The method of claim 8, wherein a first subset of effects within the grouping of effects corresponds to a higher target number of samples relative to a second subset of effects within the grouping of effects.

10. A system for previewing an audio effect, comprising:
a memory storing instructions; and
a processor coupled to the memory and configured by the instructions to at least:
retrieve audio content;
generate a user interface and obtain from a user an effect to be applied to an audio segment of the audio content;

determine a target number of samples of the audio segment based on the obtained effect, wherein the target number of samples varies with an effect type of the obtained effect;

identify a maximum amplitude and a minimum amplitude within the audio segment;

determine a first temporal window of a predetermined size centered about the maximum amplitude and a second temporal window of the predetermined size centered about the minimum amplitude;

obtain a target number of samples from the first temporal window and the second temporal window within the audio segment;

obtain the audio segment and a corresponding time period in which to apply the effect from the user via the user interface, wherein the target number of samples of the audio segment is obtained within the time period;

apply the effect to the target number of samples obtained within each of the first temporal window and the second temporal window; and display on the user interface, a graphical representation of the first temporal window and the second temporal window having the obtained target number of samples with the applied effect for the user to preview, wherein the graphical representation depicts amplitude varying as a function of time, wherein displaying the graphical representation is performed prior to generating an audio output file with the effect applied to the audio content.

11. The system of claim 10, wherein the processor is further configured to obtain additional samples of the audio content within a first temporal window centered about the maximum amplitude and obtain additional samples of the audio content within a second temporal window centered about the minimum amplitude.

12. The system of claim 11, wherein a number of additional samples to be obtained within the first temporal window and a number of additional samples to be obtained within the second temporal window are based on the effect.

13. The system of claim 11, wherein the processor is further configured to generate a sample peak file upon obtaining the additional samples within the first and second temporal windows, wherein displaying the graphical representation is based on the sample peak file.

14. The system of claim 11, wherein the processor is further configured to obtain a time period from the user via the user interface in which to apply the effect, wherein the target number of samples of the audio content is obtained within the time period.

15. The system of claim 14, wherein the processor is further configured to display a bar on the user interface corresponding to the time period in which to apply the effect.

16. A non-transitory computer-readable medium embodying a program executable in a computing device, comprising:

code that generates a user interface and obtain from a user an effect to be applied to an audio segment of audio content;

code that determines a target number of samples of the audio segment based on the obtained effect;

code that identifies, within the audio segment, a maximum amplitude and a minimum amplitude;

code that determines a first temporal window of a predetermined size centered about the maximum amplitude and a second temporal window of the predetermined size centered about the minimum amplitude;

obtains a target number of samples from the first temporal window and the second temporal window within the audio segment;

code that obtains the audio segment and a corresponding time period in which to apply the effect from the user via the user interface, wherein the target number of samples of the audio segment is obtained within the time period;

applies the effect to the target number of samples obtained within each of the first temporal window and the second temporal window; and displays on the user interface, a graphical representation of the first temporal window and the second temporal window having the obtained target number of samples with the applied effect for the user to preview, wherein the graphical representation depicts amplitude varying as a function of time, wherein displaying the graphical representation is performed prior to generating an audio output file with the effect applied to the audio content.

17. The computer-readable medium of claim 16, further comprising code that obtains additional samples of the audio content within a first temporal window centered about the maximum amplitude and obtain additional samples of the audio content within a second temporal window centered about the minimum amplitude, wherein a number of additional samples to be obtained within the first temporal window and a number of additional samples to be obtained within the second temporal window are based on the effect.

18. The computer-readable medium of claim 17, further comprising code that generates a sample peak file upon obtaining the additional samples within the first and second temporal windows, wherein displaying the graphical representation is based on the sample peak file.

19. The computer-readable medium of claim 16, wherein the graphical representation is a simulated waveform of the applied effect to the audio segment displayed to a user for fast previewing purposes.

* * * * *